United States Patent
Mian et al.

(10) Patent No.: US 8,655,540 B2
(45) Date of Patent: Feb. 18, 2014

(54) RAIL VEHICLE IDENTIFICATION AND PROCESSING

(75) Inventors: Zahid F. Mian, Loudonville, NY (US); Jeremy C. Mullaney, Clifton Park, NY (US)

(73) Assignee: International Electronic Machines Corp., Troy, NY (US)

( * ) Notice: Subject to any disclaimer, the term of this patent is extended or adjusted under 35 U.S.C. 154(b) by 1007 days.

(21) Appl. No.: 12/043,357

(22) Filed: Mar. 6, 2008

(65) Prior Publication Data

US 2009/0055041 A1   Feb. 26, 2009

Related U.S. Application Data

(60) Provisional application No. 60/935,575, filed on Aug. 20, 2007.

(51) Int. Cl.
*B61L 1/16* (2006.01)

(52) U.S. Cl.
USPC .......... 701/29.1; 701/19; 701/29.2; 701/29.3; 701/31.4

(58) Field of Classification Search
CPC ............ B61L 1/16; B61L 1/161; B61L 1/631
USPC ............................. 701/29, 33, 34; 246/122 R
See application file for complete search history.

(56) References Cited

U.S. PATENT DOCUMENTS

| | | |
|---|---|---|
| 1,028,831 A | 6/1912 | Stagg |
| 1,200,644 A * | 10/1916 | Abendroth ...................... 267/31 |
| 3,132,749 A | 5/1964 | Whitehouse et al. |
| 3,211,907 A | 10/1965 | Blaisdell et al. |
| 3,247,509 A | 4/1966 | Hamann et al. |
| 3,682,325 A | 8/1972 | Peterson et al. |
| 3,721,821 A | 3/1973 | Blanyer |
| 3,736,420 A | 5/1973 | Elder et al. |

(Continued)

FOREIGN PATENT DOCUMENTS

| | | |
|---|---|---|
| GB | 2352486 A | 1/2001 |
| JP | 2002019606 | 1/2002 |

OTHER PUBLICATIONS

Unknown, "Sick IVP—A New Dimension in Vision," accessed from http://www.sickivp.se/sickivp/en.htm, date unknown, printed on Jan. 30, 2008, 1 page.

(Continued)

*Primary Examiner* — John Q Nguyen
*Assistant Examiner* — Michael Whalen
(74) *Attorney, Agent, or Firm* — LaBatt, LLC

(57) ABSTRACT

A solution for further automating the identification and processing of rail vehicles is provided. Each individual rail vehicle in a series of rail vehicles is identified and data is acquired for the rail vehicle. Identification of each rail vehicle can be implemented using a set of electromagnetic beams that are emitted and detected across a set of rails in such a manner as to enable the reliable identification of individual rail vehicles. Data acquisition for the rail vehicles can include evaluation of one or more parts of the rail vehicle, particularly the rail wheels, for the presence of one or more defects. Data on the part(s), such as rail wheels, can be reliably assigned to a corresponding rail vehicle by also accounting for changes in the direction of movement of the rail vehicle in locations such as a classification yard.

20 Claims, 10 Drawing Sheets

(56) References Cited

U.S. PATENT DOCUMENTS

| | | | |
|---|---|---|---|
| 3,750,897 A | 8/1973 | Murato et al. | |
| 3,854,598 A | 12/1974 | Yamazaki et al. | |
| 4,288,689 A | 9/1981 | Lemelson et al. | |
| 4,532,511 A | 7/1985 | Lemelson | |
| 4,610,206 A | 9/1986 | Kubala et al. | |
| 4,779,203 A | 10/1988 | McClure et al. | |
| 4,904,939 A | 2/1990 | Mian | |
| 4,947,353 A * | 8/1990 | Quinlan, Jr. | 702/158 |
| 5,062,673 A | 11/1991 | Mimura | |
| 5,139,161 A | 8/1992 | Long | |
| 5,181,472 A | 1/1993 | Scheuchzer | |
| 5,433,111 A | 7/1995 | Hershey et al. | |
| 5,531,337 A | 7/1996 | Cappelletti et al. | |
| 5,550,953 A | 8/1996 | Seraji | |
| 5,636,026 A | 6/1997 | Mian et al. | |
| 5,678,789 A * | 10/1997 | Pipich | 246/3 |
| 5,737,500 A | 4/1998 | Seraji et al. | |
| 5,828,979 A | 10/1998 | Polivka et al. | |
| 6,125,311 A | 9/2000 | Lo | |
| 6,397,130 B1 | 5/2002 | Carr et al. | |
| 6,416,020 B1 | 7/2002 | Gronskov | |
| 6,484,074 B1 | 11/2002 | Hazard et al. | |
| 6,523,411 B1 | 2/2003 | Mian et al. | |
| 6,636,814 B1 | 10/2003 | McCullers et al. | |
| 6,655,502 B2 | 12/2003 | Sokoll et al. | |
| 6,681,160 B2 | 1/2004 | Bidaud | |
| 6,768,551 B2 | 7/2004 | Mian et al. | |
| 6,922,632 B2 | 7/2005 | Foxlin | |
| 6,957,780 B2 * | 10/2005 | Rosa | 239/67 |
| 7,213,789 B1 * | 5/2007 | Matzan | 246/169 S |
| 7,328,871 B2 * | 2/2008 | Mace et al. | 246/169 R |
| 7,438,075 B1 * | 10/2008 | Huntington et al. | 134/57 R |
| 7,593,795 B2 | 9/2009 | Kane et al. | |
| 7,748,900 B2 | 7/2010 | Maschke | |
| 7,974,736 B2 | 7/2011 | Morin et al. | |
| 8,002,365 B2 | 8/2011 | Jacobsen et al. | |
| 2002/0007289 A1 | 1/2002 | Malin et al. | |
| 2002/0101361 A1 * | 8/2002 | Barich et al. | 340/907 |
| 2003/0072001 A1 | 4/2003 | Mian et al. | |
| 2004/0049327 A1 | 3/2004 | Kondratenko et al. | |
| 2004/0068361 A1 | 4/2004 | Cross et al. | |
| 2004/0181321 A1 | 9/2004 | Fries et al. | |
| 2004/0194549 A1 * | 10/2004 | Noel | 73/587 |
| 2005/0226201 A1 | 10/2005 | McMillin et al. | |
| 2005/0258943 A1 | 11/2005 | Mian et al. | |
| 2005/0259273 A1 | 11/2005 | Mian et al. | |
| 2006/0231685 A1 * | 10/2006 | Mace et al. | 246/169 R |
| 2007/0061041 A1 | 3/2007 | Zweig | |
| 2007/0061043 A1 | 3/2007 | Ermakov et al. | |
| 2007/0064244 A1 | 3/2007 | Mian et al. | |
| 2007/0075192 A1 | 4/2007 | Mian et al. | |
| 2007/0233333 A1 | 10/2007 | Moffett et al. | |
| 2008/0149782 A1 | 6/2008 | Tiwari et al. | |
| 2008/0297590 A1 | 12/2008 | Barber et al. | |
| 2008/0304065 A1 * | 12/2008 | Hesser et al. | 356/400 |
| 2008/0306705 A1 * | 12/2008 | Luo et al. | 702/134 |
| 2010/0068024 A1 | 3/2010 | Agens | |
| 2010/0263948 A1 | 10/2010 | Couture et al. | |

OTHER PUBLICATIONS

Unknown, "Videre Design," accessed from http://www.videredesign.com, date unknown, printed on Jan. 30, 2008, 1 page.

Unknown, "Point Grey Research Inc.," accessed from http://www.ptgrey.com, date unknown, printed on Jan. 30, 2008, 1 page.

Unknown, "Selkirk Yard," accessed from http://www.trainweb.org/railnuts/yard.html, date unknown, printed on Dec. 14, 2007, 6 pages.

Shughart et al., "A Comprehensive Decision Support System for Hump Yard Management Using Simulation and Optimization," Innovative Scheduling, Inc., Gainesville, Florida, Aug. 1, 2006, 44 pages.

Sukumar et al., "Robotic Three-Dimensional Imaging System for Under-Vehicle Inspection", Journal of Electronic Imaging, vol. 15, No. 3, 2006, 11 pages.

Varghese, U.S. Appl. No. 12/171,438, Notice of Allowance & Fees Due, Nov. 10, 2011, 11 pages.

Sasha Varghese, PTO Office Action, U.S. Appl. No. 12/171,438, Notification Date Apr. 27, 2011, 22 pages.

Katz et al., "The UMass Mobile Manipulator UMan: An Experimental Platform for Autonomous Mobile Manipulation", In Proc. RSS Workshop Manipulation for Human Environments, Philadelphia, Pa, Aug. 2006, 8 pages.

Yamamoto et al. "Optical Sensing for Robot Perception and Localization", 2005 IEEE Workshop on Advanced Robotics and Its Social Impacts, pp. 14-17.

Nolan, U.S. Appl. No. 12/563,577, Office Action Communication, Jul. 20, 2012, 39 pages.

Nolan, U.S. Appl. No. 12/563,577, Office Action Communication, Jan. 18, 2013, 25 pages.

Ikeda, Asymptotic Stable Guidance Control of PWS Mobile Manipulator and Dynamical Influence of Slipping Carrying Object to Stability, Proceedings of the 2003 IEEE/RSJ, Intl. Conference on Intelligent Robots and Systems, Las Vegas, Nevada, Oct. 2003, pp. 2197-2202.

Edwards, "Improving the Efficiency and Effectiveness of Railcar Safety Appliance Inspection Using Machine Vision Technology", Proceedings of JRC2006, Joint Rail Conference, Apr. 4-6, 2006, Atlanta, GA, pp. 81-89.

* cited by examiner

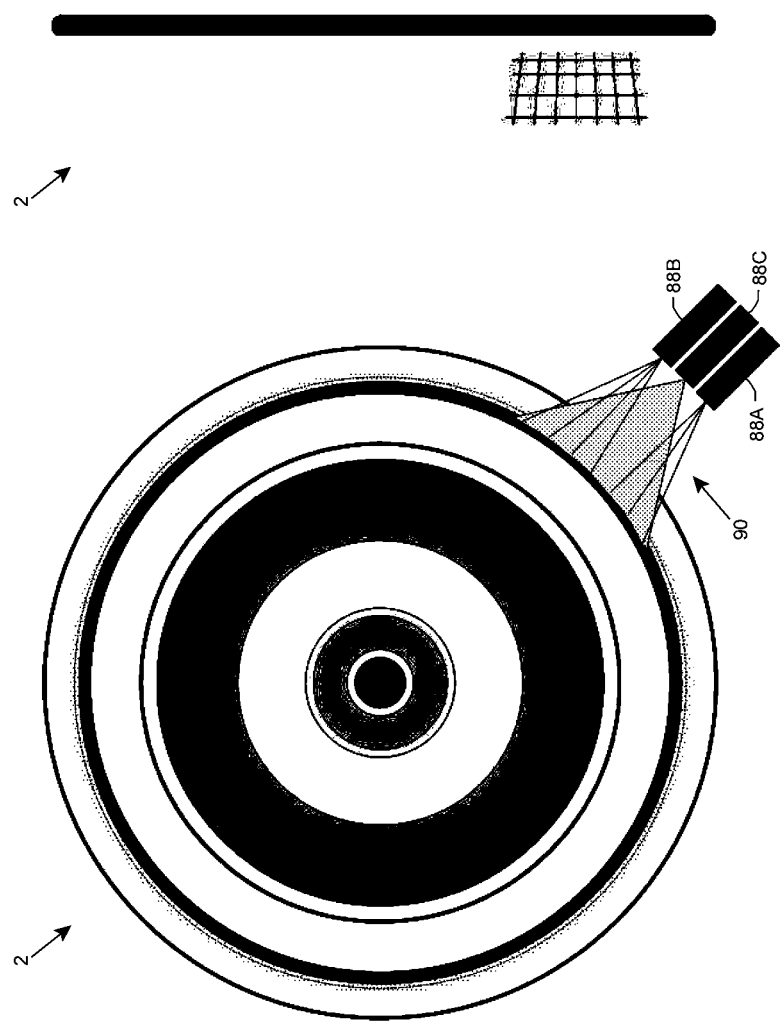

RAIL VEHICLE IDENTIFICATION AND PROCESSING

REFERENCE TO PRIOR APPLICATIONS

The current application claims the benefit of co-pending U.S. Provisional Application No. 60/935,575, titled "Description of a system, method, and device for safety and maintenance of rolling stock in a 'hump yard' or other centralized railway environments", which was filed on 20 Aug. 2007, and which is hereby incorporated by reference.

TECHNICAL FIELD

The disclosure relates generally to processing rail vehicles, and more particularly, to identifying, acquiring data for, and processing individual rail vehicles.

BACKGROUND ART

During use, railroad wheels are subjected to high, long-term stresses. Despite being made of high-quality steel, the stresses cause the wheels to become worn over a long period of operation. Without maintenance, a wheel can become too thin or otherwise no longer of the correct geometry. Further, the wheels may develop other defects, such as, for example, a "slid flat" or "flat spot", which is caused by locking the wheels with the brakes in an attempt to stop.

The wheels of railroad cars and locomotives cannot turn differentially since they are affixed to solid axles. As a result, any difference between the shape and/or size of the wheels on either side of a car/locomotive can cause a tendency to turn, leading to an increased possibility of derailment. Therefore, it is important to periodically inspect the wheels on railroad cars and locomotives to ensure that they remain safe to operate, both as an individual wheel and as a pair of wheels on the same axle.

The use of a J-shaped, steel wheel gauge is a common approach to inspecting rail wheels. In this approach, an inspector manually places the gauge on the wheel, ensures contact with all relevant portions of the wheel, reads the measurements from marked scales on the gauge, and manually enters the data. Similarly, an electronic wheel gauge can be used, which performs some of the functions automatically, thereby improving accuracy and reducing the overall time spent measuring the wheels. Various illustrative embodiments of handheld electronic wheel gauges are shown and described in U.S. Pat. No. 4,904,939, U.S. Patent Application Publication No. 2005/0259273, and U.S. Patent Application Publication No. 2007/0075192, each of which is incorporated by reference. In both approaches, the inspection is carried out by hand, on one wheel at a time, on a stationary train. To address this limitation, a number of approaches seek to measure rolling stock wheels while they are in motion, detect various defects through the measurements, and record the associated data in an automated fashion. Various illustrative embodiments of such measurement solutions are shown and described in U.S. Pat. No. 5,636,026, U.S. Pat. No. 6,768,551, U.S. Pat. No. 6,523,411, and U.S. Patent Application Publication No. 2007/0064244, each of which is incorporated by reference.

Frequently, rail wheels are inspected at a classification yard (e.g., hump yard, flat-shunted yard, gravity yard, and/or the like). For example, an incoming train may be halted while one or more cars are manually inspected. Often, due to time constraints, only a few cars are actually inspected and/or the inspection is only cursory (e.g., visual inspection). Subsequently, the cars on the incoming train are classified and routed to corresponding tracks for inclusion on an outgoing train. The classification is performed based on a destination for each car. Once an outgoing train is assembled, one or more cars may be manually (e.g., visually) inspected along with an inspection of the brakes for the train. Subsequently, the train will leave the classification yard for the next destination.

SUMMARY OF THE INVENTION

The inventors recognize, among other things, a need for a solution that improves and/or provides the detection of various flaws that are important to the railroad industry and/or provides a coordinated solution for assuring that any defects detected from measured wheels are addressed in a timely and appropriate manner. This need and/or other needs not expressly discussed herein, are met by embodiments of the solution described herein. To this extent, this disclosure describes a management solution in which the overall design enables the proper and timely maintenance of rolling stock (e.g., locomotives, railroad cars, wagons, coaches, etc.). Further, this disclosure discusses various measurement and/or evaluation solutions from one or more of which the management solution can obtain accurate and sufficient data for performing the maintenance in a timely and effective manner.

Aspects of the invention provide a solution for further automating the identification and processing of rail vehicles. Each individual rail vehicle in a series of rail vehicles is identified and data is acquired for the rail vehicle. Identification of each rail vehicle can be implemented using a set of electromagnetic beams that are emitted and detected across a set of rails in such a manner as to enable the reliable identification of individual rail vehicles. Data acquisition for the rail vehicles can include evaluation of one or more parts of the rail vehicle, particularly the rail wheels, for the presence of one or more defects. Data on the part(s), such as rail wheels, can be reliably assigned to a corresponding rail vehicle by also accounting for changes in the direction of movement of the rail vehicle in locations such as a classification yard.

A first aspect of the invention provides a method of processing rail vehicles, the method comprising: identifying each individual rail vehicle as it moves along a set of rails, the identifying including: emitting and detecting a set of electromagnetic beams across the set of rails, the set of electromagnetic beams having a height and angle that enable the detection of a gap between any two of a plurality of types of connected railroad cars; and identifying each rail vehicle based on an obstruction of at least one of the set of electromagnetic beams; acquiring data for each identified rail vehicle as it moves along the set of rails; and providing the acquired data for processing each identified rail vehicle.

A second aspect of the invention provides a system for processing rail vehicles, the system comprising: a component for identifying each individual rail vehicle as it moves along a set of rails, wherein the component for identifying is configured to: emit and detect a set of electromagnetic beams across the set of rails, the set of electromagnetic beams having a height and angle that enable the detection of a gap between any two of a plurality of types of connected railroad cars; and identify each rail vehicle based on an obstruction of at least one of the set of electromagnetic beams; a component for acquiring data for each identified rail vehicle as it moves along the set of rails; and a component for providing the acquired data for processing each identified rail vehicle.

A third aspect of the invention provides a method of generating a system for processing rail vehicles, the method comprising: providing a computer system operable to: identify each individual rail vehicle as it moves along a set of rails, the identifying including: emitting and detecting a set of electromagnetic beams across the set of rails, the set of electromagnetic beams having a height and angle that enable the detection of a gap between any two of a plurality of types of connected railroad cars; and identifying each rail vehicle based on an obstruction of at least one of the set of electromagnetic beams; acquire data for each identified rail vehicle as it moves along the set of rails; and provide the acquired data for processing each identified rail vehicle.

A fourth aspect of the invention provides a method of processing a series of connected rail vehicles, the method comprising: identifying each individual rail vehicle in the series of connected rail vehicles as it moves along a set of rails; acquiring data for each identified rail vehicle, the acquiring including: obtaining a destination for each rail vehicle; detecting a rail wheel while the rail vehicle is moving; determining a direction of the movement of the rail wheel; measuring the rail wheel while the rail vehicle is moving; evaluating the rail wheel for at least one defect based on the measuring; and including evaluation data for the rail wheel in the data for the rail vehicle; and providing the acquired data for processing each identified rail vehicle.

A fifth aspect of the invention provides a system for processing a series of connected rail vehicles, the system comprising: a component for identifying each individual rail vehicle in the series of connected rail vehicles as it moves along a set of rails; a component for acquiring data for each identified rail vehicle, wherein the component for acquiring is configured to: obtain a destination for each rail vehicle; detect a rail wheel while the rail vehicle is moving; determine a direction of the movement of the rail wheel; measure the rail wheel while the rail vehicle is moving; evaluate the rail wheel for at least one defect based on the measuring; and include evaluation data for the rail wheel in the data for the rail vehicle; and a component for providing the acquired data for processing each identified rail vehicle.

A sixth aspect of the invention provides a method of generating a system for processing a series of connected rail vehicles, the method comprising: providing a computer system operable to: identify each individual rail vehicle in the series of connected rail vehicles as it moves along a set of rails; acquire data for each identified rail vehicle, the acquiring including: obtaining a destination for each rail vehicle; detecting a rail wheel while the rail vehicle is moving; determining a direction of the movement of the rail wheel; measuring the rail wheel while the rail vehicle is moving; evaluating the rail wheel for at least one defect based on the measuring; and including evaluation data for the rail wheel in the data for the rail vehicle; and provide the acquired data for processing each identified rail vehicle.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIG. 10 shows side and front views of another illustrative solution for illuminating a tread surface of a rail wheel with lines according to an embodiment.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a solution for further automating the identification and processing of rail vehicles. Each individual rail vehicle in a series of rail vehicles is identified and data is acquired for the rail vehicle. Identification of each rail vehicle can be implemented using a set of electromagnetic beams that are emitted and detected across a set of rails in such a manner as to enable the reliable identification of individual rail vehicles. Data acquisition for the rail vehicles can include evaluation of one or more parts of the rail vehicle, particularly the rail wheels, for the presence of one or more defects. Data on the part(s), such as rail wheels, can be reliably assigned to a corresponding rail vehicle by also accounting for changes in the direction of movement of the rail vehicle in locations such as a classification yard. As used herein, unless otherwise noted, the term "set" means one or more (i.e., at least one) and the phrase "any solution" means any now known or later developed solution.

In an illustrative application, which is used to describe aspects of the invention herein, a classification yard includes a system for evaluating rolling stock in each of many consists (e.g., one or more connected rail vehicles) of rolling stock. The system can route any rolling stock that is evaluated as including one or more designated defects to a maintenance area, which can address the defect(s) before allowing the rolling stock to be included on a train that is sent out to various destinations for delivery. In this manner, the system can improve: safety by reducing a likelihood of an accident in which one or more of the defects is a contributing cause; efficiency by removing defects that can lead to increased energy expenditure during operation; and/or the like.

Figure 1:
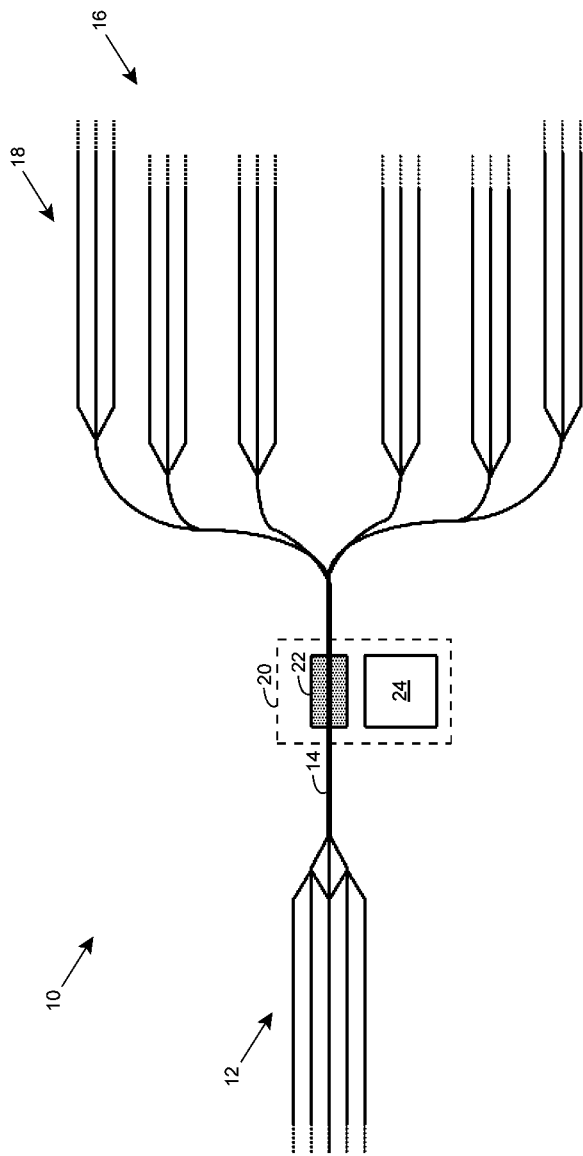
FIG. 1 shows an illustrative simplified diagram of a classification yard according to an embodiment.

FIG. 1 shows an illustrative simplified diagram of a classification yard 10 according to an embodiment. Classification yard 10 includes a number of consist assembly tracks 12 that feed into a single rail line 14. All rail traffic passing through classification yard 10, apart from through traffic, passes along rail line 14. Rail line 14 then diverges into multiple outbound tracks 16. Rolling stock evaluated as having defect(s) that require service is/are routed to a dedicated set of maintenance tracks 18.

Classification yard 10 includes a processing system 20, which can evaluate the rolling stock for the presence of one or more defects and route the rolling stock based on the defect(s) and/or its destination. To this extent, processing system 20 is shown including an evaluation component 22 that automatically acquires measurement data and evaluates various aspects of the rolling stock as it travels along rail line 14. Evaluation component 22 can provide measurement and/or evaluation data to a management component 24, which can route the rolling stock accordingly. Management component 24 can include a computer system that aids in routing the rolling stock (e.g., by designating a track, operating switches to route the rolling stock to the track, and/or the like). A user can be located in a control tower or the like, which can assist the user in overseeing the operations of classification yard 10 while utilizing management component 24 in moving rolling stock through classification yard 10. In this manner, classification yard 10 permits a real-time assignment of good order or bad order evaluation to all passing rolling stock, which further enables more efficient processing of the rolling stock through classification yard 10.

Figure 2:
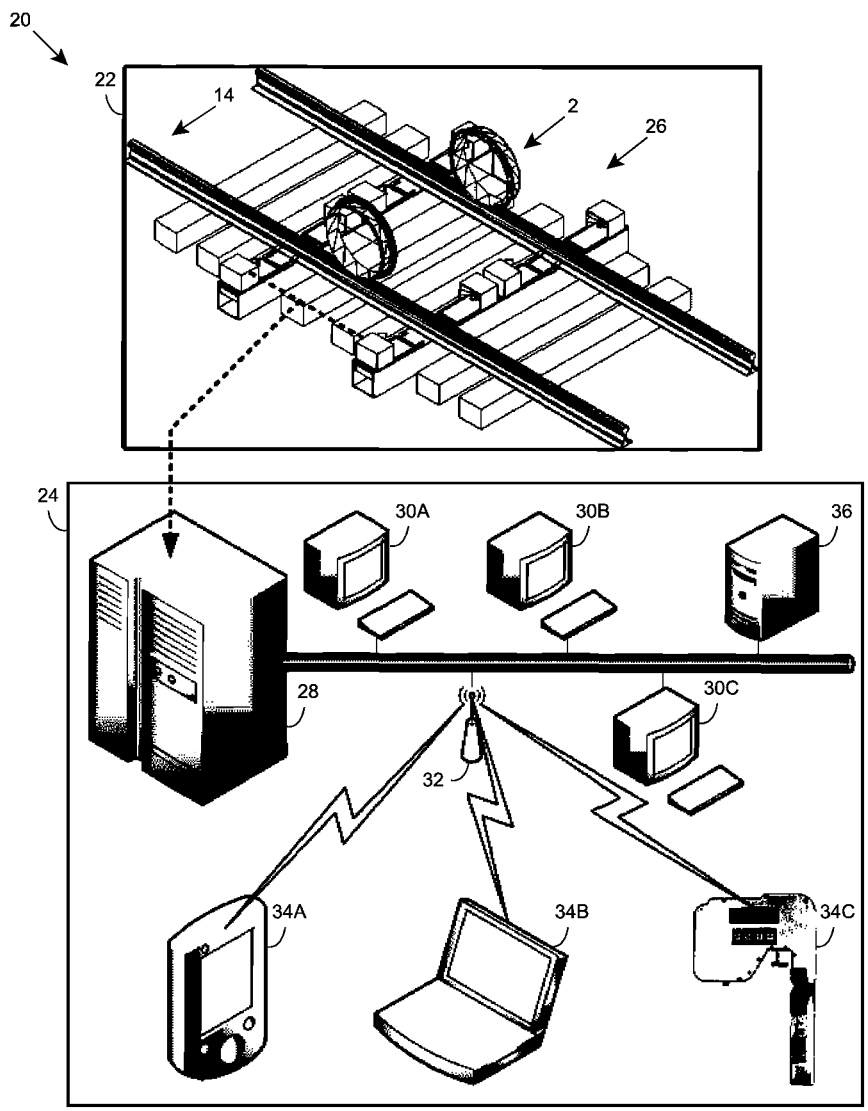
FIG. 2 shows additional details of an illustrative processing system according to an embodiment.

FIG. 2 shows additional details of an illustrative processing system 20 according to an embodiment. In this case, rolling stock moves along rail line 14 on rail wheels 2. As wheels 2 move along rail line 14, a wayside measurement component 26 senses and measures various aspects of wheels 2 using any solution. To this extent, wayside measurement component 26 can include any combination of various forms of sensors, illuminating devices, data-gathering subsystems, and/or communications devices. Wayside measurement component 26 transfers data on wheels 2 for use by management component 24. In an embodiment, wayside measurement component 26 acquires the measurement data, evaluates wheels 2 for the presence of one or more defects, and provides the measurement and/or evaluation data for use by management component 24. Alternatively, wayside measurement component 26 can provide measurement data for wheels 2 for use by management component 24, which evaluates the measurement data for the presence of one or more defects in wheels 2. In any event, wayside measurement component 26 can process, such as filter, enhance, compress, and/or the like, the measurement data prior to providing the measurement data for use by management component 24. Further, while only a single wayside measurement component 26 is shown, it is understood that processing system 20 can include any number and configuration of wayside measurement components 26, which are located adjacent to tracks in any part of classification yard 10 (FIG. 1).

Management component 24 includes a central data processing and storage unit 28, which receives and stores the data acquired by wayside measurement component(s) 26. While shown as a single computing device, it is understood that central data processing and storage unit 28 can comprise multiple computing devices configured in any manner (e.g., one for each wayside measurement component 26) and in communication with one another using any solution. In any event, central data processing and storage unit 28 can process the data received from wayside measurement component(s) 26 to determine whether any of the wheels 2 on the rolling stock moving along rail line 14 require maintenance.

In an embodiment, processing system 20 evaluates the wheels 2 of all passing rolling stock for the presence of one or more defects. Further, processing system 20 can automatically identify each passing rolling stock and identify a location on that rolling stock of the defective wheel(s) 2, if any. To this extent, central data processing and storage unit 28 can manage a defect database that includes an identity of the rolling stock having one or more defects and each specific part defect and its location (e.g., wheel on the rolling stock). Central data processing and storage unit 28 can make the defect database available to maintenance/service (shop) personnel whose job it is to verify and/or repair the defects. Once repaired or evaluated as a false positive, the maintenance personnel can update the defect database and route the rolling stock according to its destination.

To this extent, central data processing and storage unit 28 can communicate with one or more other computer systems located at classification yard 10 (FIG. 1) and/or remote from classification yard 10. For example, management component 24 can include a physical network (e.g., Ethernet, Firewire, USB, and/or the like) that includes various terminal devices 30A-C (e.g., personal computers) located throughout classification yard 10 (e.g., at a maintenance shop). Terminal devices 30A-C can receive data from central data processing and storage unit 28 (e.g., maintenance requirements) and provide data to central data processing and storage unit 28 (e.g., status of maintenance) using any solution. Similarly, a wireless access point 32 can be included to provide wireless connectivity to various portable computing devices 34A-C that are utilized throughout classification yard 10. Portable computing devices 34A-C can include a wireless personal digital assistant (PDA) 34A, a laptop computer 34B, a wireless electronic wheel gauge 34C, each of which can be utilized to receive and/or provide data from/to central data processing and storage unit 28. Still further, central data processing and storage unit 28 and/or a data server 36 (e.g., a web server) can provide access to some or all of the data on central data processing and storage unit 28 to one or more computer systems (e.g., railroad headquarters) remote from classification yard 10 via a public or private network, such as the world wide web.

Processing system 20 can automatically evaluate the condition of rolling stock and the parts thereof with respect to various parameters that are capable of being sensed using any solution. For example, the parameters can include: specific dimensions of a wheel (e.g., diameter, flange thickness, flange height, etc.), which can be detected using any combination of various illumination/sensing solutions; internal flaws (e.g., a crack), which can be detected using various sensing solutions, such as ultrasonic, electromagnetic acoustic transducer(s); external flaws (e.g., slid flats, out of round, etc.), which also can be detected using any combination of various illumination/sensing solutions; axle flaws (e.g., mismatched wheel diameters on an axle), which requires accurate identification of paired wheels and their corresponding measurements; and/or the like.

By automatically detecting and evaluating the rolling stock for the presence of one or more defects, processing system 20 can implement one or more additional functions. For example, management component 24 can: automatically route a vehicle that is evaluated as including one or more defects to maintenance tracks 18 (FIG. 1) without requiring additional human intervention; automatically prepare and/or verify a work order for a vehicle (e.g., including a vehicle identification, particular wheel(s) with defect(s), identification of defect and/or severity of defect, etc.), and forward the work order to the correct personnel (e.g., wheel shop) that will perform the work; automatically upload potential problem cars/wheels to inspector(s) for further evaluation, thereby providing an inspector with a schedule of his/her day's work; automatically update vehicle data based on further evaluation (e.g., manual evaluation by an inspector using, for example, a handheld gauge 34C); automatically update and accumulate a maintenance history of wheel(s) and rolling stock, which can comprise, for example: for each car, a time/type of inspection, location of inspection, wheel/axle/vehicle identifier(s), specific track/direction of car, vehicle speed during inspection, maintenance record, etc.; for each axle, an angle of attack, a back-to-back measurement, etc.; and for each wheel, a rim thickness, diameter, flange width, flange height, detected flaw (s) and flaw data (e.g., how detected, certainty, etc.), etc. Further, management component 24 can enable a user to update a condition of a vehicle/vehicle part after repair, update a part identifier (e.g., when a part is replaced), schedule and/or route the repaired vehicle to an outbound track 16 (FIG. 1) based on its destination, etc.

In order to enable the automated/semi-automated routing and re-routing of rolling stock, it is important to accurately identify each individual rail vehicle in the rolling stock as it moves along rail line 14. For example, when rail wheels 2 are evaluated for the presence of one or more defects, it is important to accurately identify the corresponding rail vehicle on which a potentially defective wheel 2 is located so that the correct rail vehicle is re-routed for maintenance. In an embodiment, an RFID tag is located on each rail vehicle, and is read by wayside measurement component 26 as the rail vehicle passes using any solution. In another embodiment, wayside measurement component 26 captures and processes image data to identify each rail vehicle as it passes using any solution. For example, wayside measurement component 26 can perform segmentation, blob detection, template comparison, and/or the like on image data to enumerate and identify rail vehicles. The decomposition and analysis of images from video in this fashion makes it possible to detect, track, and identify objects of interest within a video image stream. To this extent, an embodiment of wayside measurement component 26 can implement one or more aspects of the monitoring solution shown and described in U.S. Patent Application Publication No. 2005/0258943, which is incorporated by reference.

However, current implementations of each of these identification approaches are limited to some degree. For example, wayside measurement component 26 may fail to activate/read an RFID tag, an RFID tag may not be present/functioning on a rail vehicle, and/or the like. In field observations, the inventors have found an error rate with RFID tags of approximately one percent or more, which is significant for many applications. Similarly, the accuracy with which wayside measurement component 26 can perform image data processing may be susceptible to various environmental conditions (e.g., fog, night vs. day, obstructions, etc.), the speed of the rail vehicles, etc. Still further, manual solutions are susceptible to operator inattentiveness and human error.

Figure 3:
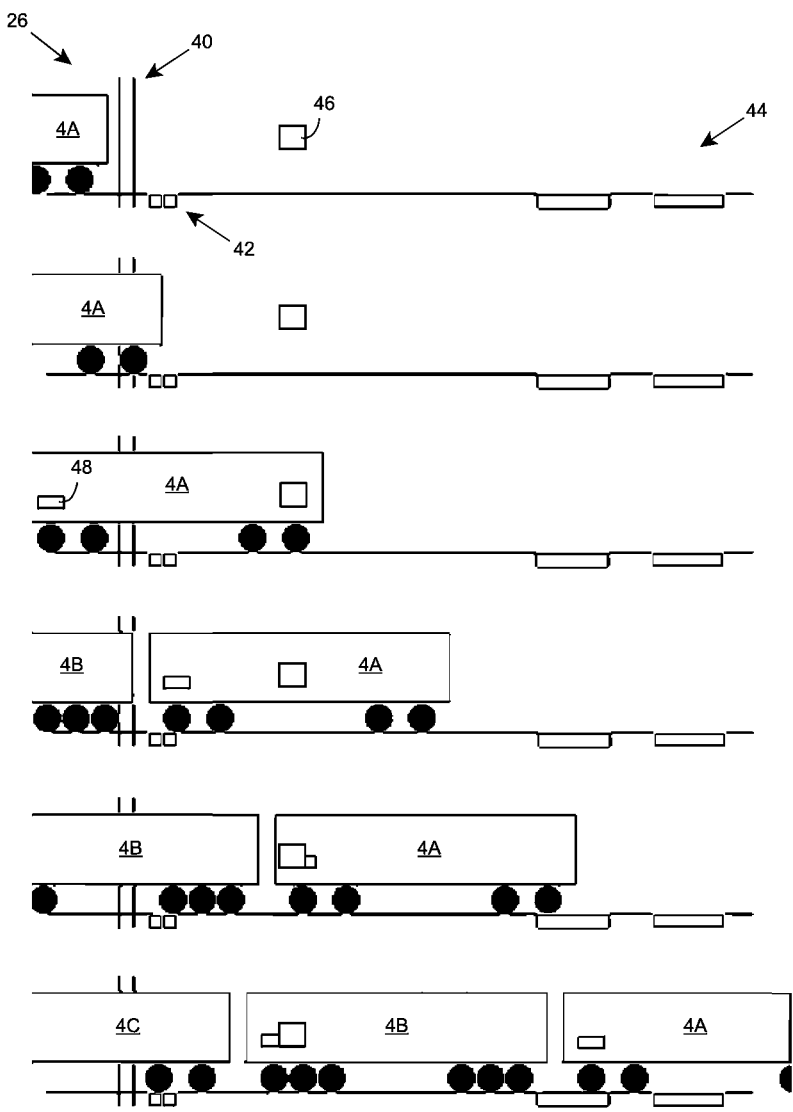
FIG. 3 shows an illustrative wayside measurement component as rolling stock moves past according to an embodiment.

For this purpose, it is preferable to have a self-contained identification solution that can detect the passage of all forms of rail vehicles. Additionally, the identification solution can self-diagnose to assure that it remains operational. To this extent, FIG. 3 shows an illustrative wayside measurement component 26 as rolling stock (rail vehicles 4A-C) moves past according to an embodiment. Wayside measurement component 26 is shown including a vehicle sensing module 40, a wheel sensing module 42, wheel measurement modules 44, and an RFID reader module 46.

In general, as rolling stock, which includes one or more rail vehicles 4A-C, moves toward wayside measurement component 26, a start of a rail vehicle 4A is detected by vehicle sensing module 40, and wayside measurement component 26 can assign a unique identifier to the rail vehicle 4A, which is utilized to manage all data collected for the rail vehicle 4A using any solution. At this time, wayside measurement component 26 can prepare one or more modules, such as wheel measurement modules 44, for data acquisition (e.g., open protective doors, activate lasers or other energy-intensive devices, etc.). Subsequently, wheel sensing module 42 detects the presence of a rail wheel and assigns the detected rail wheel (wheel axle) to the currently detected vehicle 4A using any solution. Wayside measurement component 26 also can assign a unique (at least with respect to each vehicle) identifier for each rail wheel/wheel axle detected for a corresponding rail vehicle 4A using any solution. In any event, wayside measurement component 26 will include measurement and/or evaluation data acquired for each part, such as rail wheel 2, in the data for the corresponding rail vehicle 4A-C using any solution.

As the rolling stock continues to move through wayside measurement component 26, vehicle sensing module 40 will detect an end of rail vehicle 4A and the start of rail vehicle 4B. As a result, wheel sensing module 42 will begin to assign each detected rail wheel to the next vehicle 4B, and a total number of axles for rail vehicle 4A will be known. This process continues for all rail vehicles 4A-C in the rolling stock that pass through wayside measurement component 26. In order to ensure proper operation between vehicle sensing module 40 and rail wheel sensing module 42, it is understood that the various devices should be co-located such that a rail wheel for a previous rail vehicle, e.g., rail vehicle 4A, will not be detected after vehicle sensing module 40 detects the beginning of a subsequent rail vehicle, e.g., rail vehicle 4B.

In any event, as rail vehicles 4A-C move through wayside measurement component 26, RFID reader module 46 can attempt to read RFID tag(s) that may be associated with each rail vehicle 4A-C. If successful, the RFID data can be stored with the other data for the corresponding rail vehicle 4A-C using any solution. Similarly, while not shown, wayside measurement component 26 can incorporate other types of sensing devices, such as an imaging device that is situated such that it has a clear and normally unobstructed view of a rail segment of interest, and which can capture and store visible, infrared, and/or the like, based image data for the rail vehicles 4A-C as they move along the rail segment. Wayside measurement component 26 can process the image data to detect, identify, and/or track rail vehicles 4A-C, acquire additional data, such as markings (e.g., identification serial numbers/ words), and/or the like, which can be utilized to verify the identity, ownership, and general nature of the passing rail vehicles 4A-C.

Further, vehicle sensing module 40, wheel sensing module 42, and/or one or more other modules (e.g., an image processing module) can be configured to obtain additional data on rail vehicle 4A, such as its speed, direction of travel, and/or the like. To this extent, using the speed and a known distance of travel, wayside measurement component 26 can calculate an approximate time at which the first wheels of rail vehicle 4A will arrive at wheel measurement modules 44. In this manner, wheel measurement modules 44 can begin operations, such as illuminating an area through which rail wheels will be imaged, in a just-in-time fashion. In any event, once within measurement range, wheel measurement modules 44 can acquire measurement data for the rail wheels using any solution, which wayside measurement component 26 can store with the remaining data for the corresponding vehicle/ axle/wheel. It is understood that while two wheel measurement modules 44 are shown, wayside measurement component 26 can include any number of zero or more such measurement modules 44. Further, it is understood that each measurement module 44 can comprise an in-ground system, a wayside system, and/or the like, such as a wheel profiling system, optical wheel flaw detection system, an EMAT wheel flaw detection system, and/or the like.

In an embodiment, vehicle sensing module 40 uses a set of electromagnetic beams that are emitted and detected across the rail(s) on which the rail vehicles 4A-C are moving to identify the beginning/end of each individual connected rail vehicle 4A-C. With such a solution, the electromagnetic beams should be configured in such a manner as to enable the reliable detection of the beginning/end of all types of rail vehicles, including empty flatbeds, regular freight cars, tanker cars, etc. In particular, it is desirable to ensure either that at least one electromagnetic beam path will be clear whenever there is a separation between rail vehicles 4A-C and that no electromagnetic beam path will remain clear whenever a rail vehicle 4A-C of any design is passing through vehicle sensing module 40, or that all electromagnetic beam paths will be clear whenever there is a separation between rail vehicles 4A-C and at least one electromagnetic beam path will be blocked whenever a rail vehicle 4A-C of any design is passing through vehicle sensing module 40.

As many rail vehicles 4A-C have hoses and other accoutrements placed below them, and as the number of wheels on rail vehicles 4A-C may vary (e.g., a tanker may have eight axles, while a flatbed may have four), mounting the emitter and detector at very low levels is not reliable. Further, as the height of a flatbed car can be less than the support structure for other rail vehicles 4A-C such as a tanker, mounting the detectors at a moderately high level is also not reliable. Placing the devices at a level of the lowest rail vehicles 4A-C is also not practical, because the coupler assembly is at the same level, which will also block the beams, resulting in a failure to detect the transition between one rail vehicle 4A-C and the next.

Figure 4:
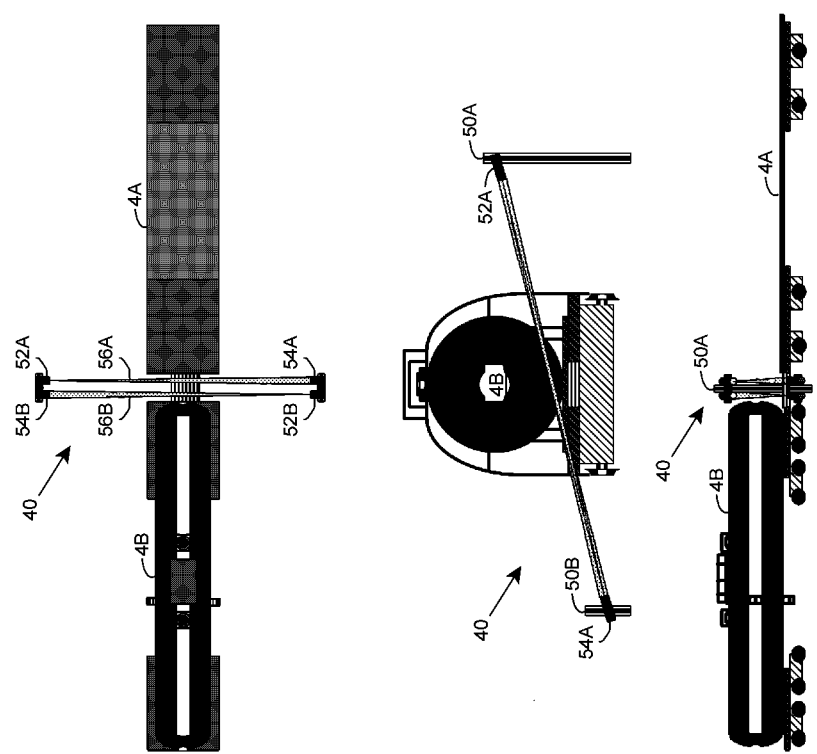
FIG. 4 shows more detailed top, front, and side views of an illustrative vehicle sensing module according to an embodiment.

To this extent, FIG. 4 shows more detailed top, front, and side views of an illustrative vehicle sensing module 40 according to an embodiment. As illustrated, vehicle sensing module 40 includes a first support 50A, e.g., a pole, on a first side of the rails and a second support 50B on an opposite side of the rails. Each support 50A-B is shown including an emitter 52A-B and a detector 54A-B, although it is understood that any arrangement and number of one or more emitter/detector pairs can be utilized. In operation, each emitter/detector pair is configured such that the emitter 52A-B emits a narrow focus electromagnetic beam 56A-B that directly impinges the corresponding detector 54A-B on the opposite side of the rails, which detects the electromagnetic beam 56A-B using any solution. In particular, emitter 52A emits beam 56A, which is detected by detector 54A, while emitter 52B emits beam 56B which is detected by detector 54B using any solution. Each detector 54A-B can generate a different signal/data based on whether the corresponding beam 56A-B is being detected using any solution, which can be processed to determine if there is an obstruction in the path of electromagnetic beam 56A-B. In an embodiment, electromagnetic beams 56A-B comprise narrow focus beams of visible light. However, it is understood that any type of detectable electromagnetic beams can be utilized (e.g., near-infrared, infrared, etc.).

As illustrated, each support 50A-B holds the corresponding devices (emitters 52A-B and detectors 54A-B) at different heights. In particular, support 50B mounts devices 52B, 54A relatively close to the ground, while support 50A mounts devices 52A, 54B relatively high from the ground. Due to the widely varying profiles and accoutrements of rail vehicles, such as rail vehicles 4A-B, the heights and angles of beams 56A-B need to be selected such that they are within a range of heights of beams 56A-B at a center line of the passing rail vehicles 4A-B and a range of angles of beams 56A-B that enable the reliable detection of a gap between two of any of various types of rail vehicles 4A-B. The corresponding heights and distances between supports 50A-B can be selected to both ensure that supports 50A-B and the devices mounted thereon, are not in the path of any rail vehicles 4A-B and ensure that the beams 56A-B pass the center line of rail vehicles 4A-B at a height and with an angle that enables the reliable detection of gaps between rail vehicles 4A-B.

As illustrated, beams 56A-B pass the center line of rail vehicles 4A-B at a height that is sufficient so that a coupler assembly between rail vehicles 4A-B does not block either beam 56A-B. However, the angle of beams 56A-B is such that an outer portion of even a lower profile rail vehicle 4A-B, such as a flatbed 4A, will block the paths of beams 56A-B. Since all coupler assemblies should be able to couple with all others on a given railroad, the height of the beams 56A-B as they pass the coupler assembly can be selected based on the known height of the assemblies (e.g., to travel a few inches above the assembly). Similarly, since the dimensions (including height and width) of the lowest/narrowest possible rail vehicle 4A-B is known, the angle of the beams 56A-B can be selected to impinge the rail vehicle 4A-B after passing over the coupler assembly at the selected height using any solution.

It is understood that vehicle sensing module 40 can utilize any number of one or more beams 56A-B to detect rail vehicles 4A-B. When two or more horizontally spaced beams 56A-B are used, vehicle sensing module 40 can acquire additional data on rail vehicles 4A-B, such as a direction of travel, a speed, and/or the like. Additionally, when available, it is understood that additional data can be combined with the data acquired using vehicle sensing module 40 to verify proper operation of wayside measurement component 26. For example, wayside measurement component 26 can implement multiple solutions (e.g., image-based, RFID tag-based, and/or the like) to individually identify rail vehicles 4A-B, determine a speed, direction of travel, type of vehicle, etc., the results of which wayside measurement component 26 can cross-reference and compare. When different results are acquired, wayside measurement component 26 can determine a most likely result, flag the discrepancy for human review, and/or the like, using any solution. To this extent, wayside measurement component 26 can use a minimum blockage time to filter/ignore false readings due to a passage of a bird flying, animal walking, hose above the coupler assembly, and/or the like.

Returning to FIG. 3, as discussed herein, wayside measurement component 26 can be implemented as part of a classification yard. To this extent, rail vehicles 4A-B may be moving at a slow speed (e.g., approximately 1.5 miles/hour or less), may temporarily stop, and may change direction in travel while they are being processed through the classification yard. The slow speed operation also enables rail vehicles 4A-C to undergo greater changes in speed as compared to higher speed operation for the same distance, making a prediction of an arrival of a rail wheel at measurement module(s) 44 less certain. In order to acquire accurate data on each rail vehicle 4A-B (e.g., number of axles, operating condition of rail wheels, etc.) in this operating environment, it is important for wayside measurement component 26 to be able to account for these motion changes when processing the rail vehicles (e.g., identifying individual vehicles, acquiring data on each vehicle, processing each vehicle, etc.).

An embodiment of vehicle sensing module 40 can account for the change in direction by determining an order in which beams 56A-B (FIG. 4) are blocked by a passing rail vehicle 4A-C. However, changes in the direction of movement may be only temporary, and may not cause rail vehicles 4A-C to move sufficiently for a gap between two rail vehicles 4A-C to be detected by vehicle sensing module 40. While image data, RFID data, and the like, also can be used to determine the direction of travel of rail vehicles 4A-C, it may be desirable for wheel sensing module 42 to be able to determine the direction that rail vehicles 4A-C are traveling to reduce the risk of assigning a detected rail wheel to an incorrect rail vehicle 4A-C.

Figure 5:
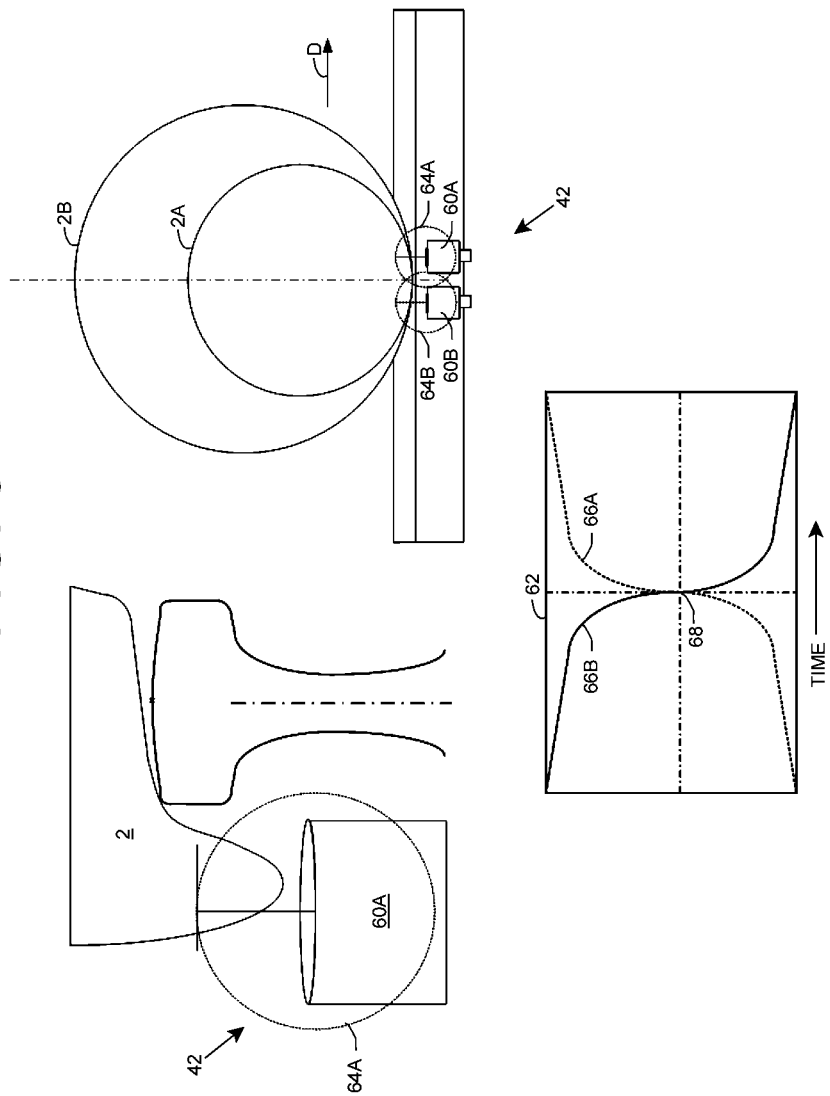
FIG. 5 shows operation of an illustrative wheel sensing module according to an embodiment.

To this extent, FIG. 5 shows operation of an illustrative wheel sensing module 42 according to an embodiment. In particular, FIG. 5 shows a head on and side perspective view of wheel sensing module 42 as well as an illustrative output 62 generated by a pair of proximity sensors 60A-B included in wheel sensing module 42. In an embodiment, each proximity sensor 60A-B comprises an inductive sensor. However, any type of sensor capable of detecting the approach and movement of rail wheel 2 (e.g., the flange of rail wheel 2) through a sensing range 64A-B can be used, such as, but not limited to sensors that operate based on electromagnetic, optical, or mechanical principles. Further, it is understood that such sensors can be selected and/or designed to compensate for and/or be unaffected by, the various electromagnetic fields present in the railroad environment (such as those generated by the AC systems of locomotives) using any solution.

Wheel sensing module 42 can determine when a rail wheel 2 of any of a range of circumferences, as indicated by rail wheels 2A-B, is at an exact position, e.g., "top dead center", over proximity sensors 60A-B. Further, wheel sensing module 42 can determine a direction of travel of the rail wheel 2. As illustrated, as rail wheel 2 rides along a rail, its flange will pass over proximity sensors 60A-B. Each proximity sensor 60A-B has a sensing range 64A-B, which is sufficient to sense flanges of a wide range of sizes. Further, since the corresponding sensing ranges 64A-B encompass a volume of space, not merely a line, proximity sensors 60A-B can be used to detect a relative location of rail wheel 2 with respect to proximity sensors 60A-B. While sensing ranges 64A-B are shown as having a spherical shape centered on the corresponding proximity sensor 60A-B, it is understood that proximity sensors 60A-B could have a sensing range 64A-B of any shape.

Regardless, proximity sensors 60A-B are positioned such that as a rail wheel 2 passes through the center of the sensor range, such as sensor range 64B, of one proximity sensor 60B, it begins to enter the sensor range 64A of the other proximity sensor 60A. A rail wheel 2 entering and leaving the sensor range 64A-B of either proximity sensor 60A-B will generate a symmetric signal curve. To this extent, as a rail wheel 2 moves in direction D over proximity sensors 60A-B, curves 66A-B will be generated by proximity sensors 60A-B. In particular, curve 66B is generated by proximity sensor 60B and is shown from the point at which rail wheel 2 has passed the center of sensor range 64B to the point at which rail wheel 2 moves out of sensor range 64B. Similarly, curve 66A is generated by proximity sensor 60A and is shown from the point at which rail wheel 2 enters sensor range 64A to the point at which rail wheel 2 is at the center of sensor range 64A. In this case, the centers of proximity sensors 60A-B are separated by the sensor range to generate the two curves, which coincide exactly in time.

Since curves 66A-B are substantially identical (as may be permitted by physical design limitations) and are symmetrical, the point 68 at which curves 66A-B intersect corresponds to the time when rail wheel 2 is precisely in between the two proximity sensors 60A-B. Consequently, wheel sensing module 42 can determine the time at which rail wheel 2 is at an exact position, e.g., top dead center, by plotting curves 66A-B and noting the intersection point 68. Further, by determining which sensor range 64A-B that rail wheel 2 enters first, wheel sensing module 42 can determine a direction of travel of rail wheel 2 using any solution. Using this information, wayside measurement component 26 can increment and/or decrement a count of axles no matter how many times rolling stock may reverse direction, thereby producing an accurate axle count for the rolling stock. Still further, curve(s) 66A-B will have a substantially horizontal (non-zero) portion when rail wheel 2 stops within a corresponding sensor range(s) 64A-B, which wayside measurement component 26 can utilize to adjust the operation of one or more modules, such as turning off or pausing the operation of measurement module(s) 44 (FIG. 3).

Returning to FIG. 3, each measurement module 44 can acquire various types of data for each rail vehicle 4A-C and/or one or more parts thereof using any solution. To this extent, measurement module(s) 44 can obtain various measurements of the rail wheels for each rail vehicle 4A-C, which can be used to evaluate the rail wheel for at least one defect. For example, measurement module 44 can acquire rail wheel data that includes: a circumference, a flange height/width, etc., using any solution, such as the projection and imaging of a number of laser/light lines on the rail wheel.

Figure 6:
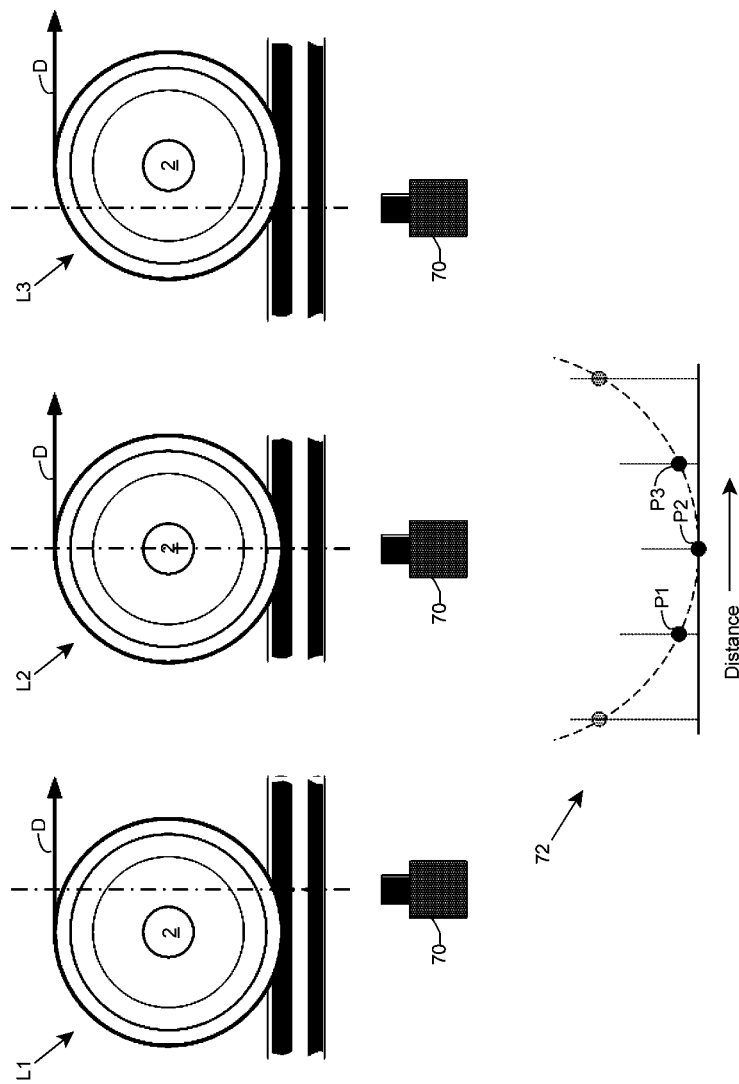
FIG. 6 shows an illustrative solution for measuring a diameter of a rail wheel using a single camera according to an embodiment.

FIG. 6 shows an illustrative solution for measuring a diameter of a rail wheel 2 using a single camera 70 according to an embodiment. In this case, wheel 2 is shown located at three locations L1, L2, L3 as it moves in direction D. At each location L1-3, wheel 2 is imaged by a high-speed camera 70 and the location (e.g., height) of an edge (e.g., flange) of wheel 2 with respect to a centerline of camera 70 is measured. By obtaining a speed of wheel 2 as it passes over camera 70 using any solution and a time interval between the captured images, measurement module 44 (FIG. 3) can determine a distance traveled by wheel 2 between consecutive images captured by camera 70. Using the distance and the location of wheel 2 with respect to the centerline of camera 70, measurement module 44 can generate a plot 72 that includes points P1, P2, P3, each of which corresponds to location L1, L2, L3, respectively. Measurement module 44 can use a curve fitting algorithm to fit points P1-3 (or additional points, if available) to a curve, which measurement module 44 can use to obtain a diameter measurement of rail wheel 2 using any solution. Since rail wheel 2 is round by default, and very few normal wear defects will change this in the case of the flange (which can comprise the imaged portion), measurement module 44 can assume a circular profile fitted to the known plotted points P1-3 to yield a good value for the diameter of the rail wheel 2. While wheel 2 is shown being imaged at top dead center of the center line (location L2), it is understood that any sequence of images in which an appropriate set of points can be located can provide sufficient data to implement the curve fitting algorithm.

Measurement module 44 may use the diameter of rail wheel 2, if of sufficient accuracy (e.g., dependent on the resolution and speed of camera 70), as a measured attribute of rail wheel 2 and/or use it to confirm the measurements and/or adjust the operation of other devices/modules in measuring attribute(s) of rail wheel 2. For example, measurement module 44 may implement an image-based measurement solution that projects laser lines that are configured to pass radially through a center of a 36" diameter rail wheel 2. However, for a 40" diameter rail wheel 2, the projected lines will pass below the center of the wheel, while the projected lines will pass above the center of a 33" diameter rail wheel 2. By knowing an approximate diameter of rail wheel 2, measurement module 44 can adjust the expected geometry of the measured wheel 2, which can yield a more reliable and accurate measurement than would otherwise be possible.

Figure 7:
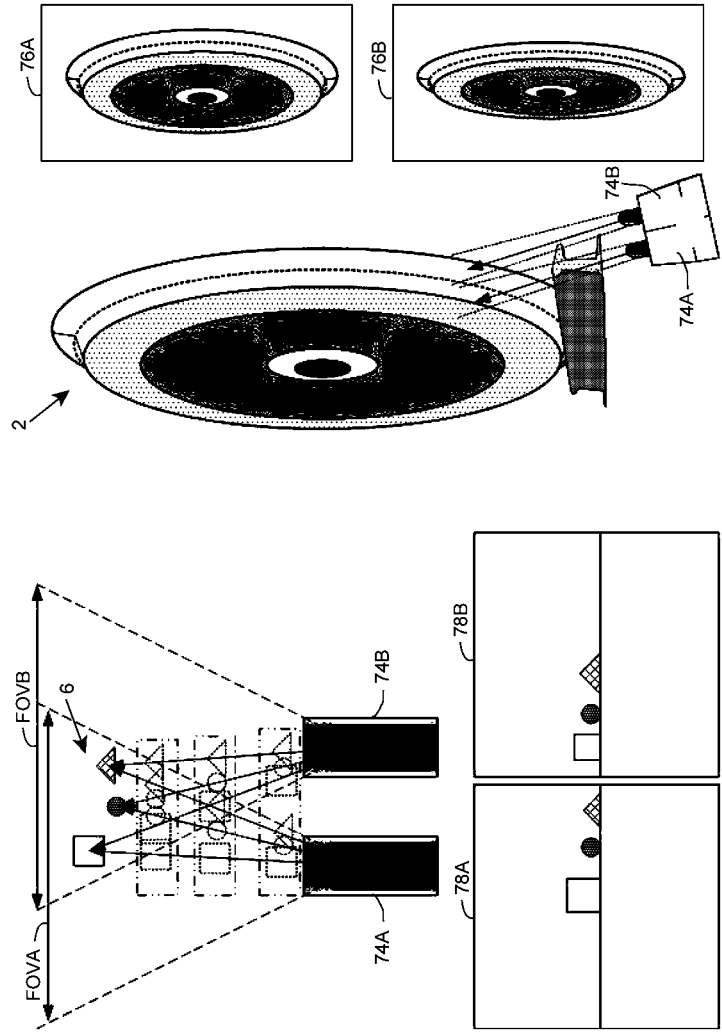
FIG. 7 shows an illustrative solution for acquiring image data of a rail wheel according to an embodiment.

In order to successfully obtain accurate measurement(s) of various wheel parameters, measurement module 44 can construct a mathematically accurate model of the wheel from image data. For example, FIG. 7 shows an illustrative solution for acquiring image data of a rail wheel 2, which measurement module 44 can use to construct a mathematically accurate model of rail wheel 2, according to an embodiment. In general, a pair of identical cameras 74A-B are fixed in a known physical relationship to one another, e.g., a known distance apart and imaging in a coplanar fashion with overlapping fields of view FOVA, FOVB. In this manner, cameras 74A-B will image the same scene in the overlapping portion, from slightly differing viewpoints. As a result, objects 6 that are located in the overlapping area of fields of view FOVA, FOVB, will appear in different locations and/or have different sizes in the corresponding images 78A-B captured by cameras 74A-B, respectively. As the distances between the cameras' 74A-B viewpoints are known exactly, measurement module 44 can use triangulation and mapping, to determine from these "stereo" images the actual position in space that objects 6 occupy in order to result in images 78A-B.

The same principles can be applied by measurement module 44 when acquiring measurement data for rail wheel 2. In particular, measurement module 44 can include cameras 74A-B, which are configured to acquire images 76A-B, respectively, of rail wheel 2 as it moves along the rail. As illustrated, cameras 74A-B can be located on an opposite side of the rail as the flange of rail wheel 2, which can enable the tread surface of rail wheel 2 to be imaged. Further, cameras 74A-B can be placed a known distance apart, and simultaneously capture images 76A-B in a coplanar fashion with overlapping fields of view. Measurement module 44 can perform the appropriate calculations (e.g., triangulation and mapping) based on the known geometry to yield a mathematical model of rail wheel 2, which measurement module 44 can use to determine the measurements for rail wheel 2.

Figure 8:
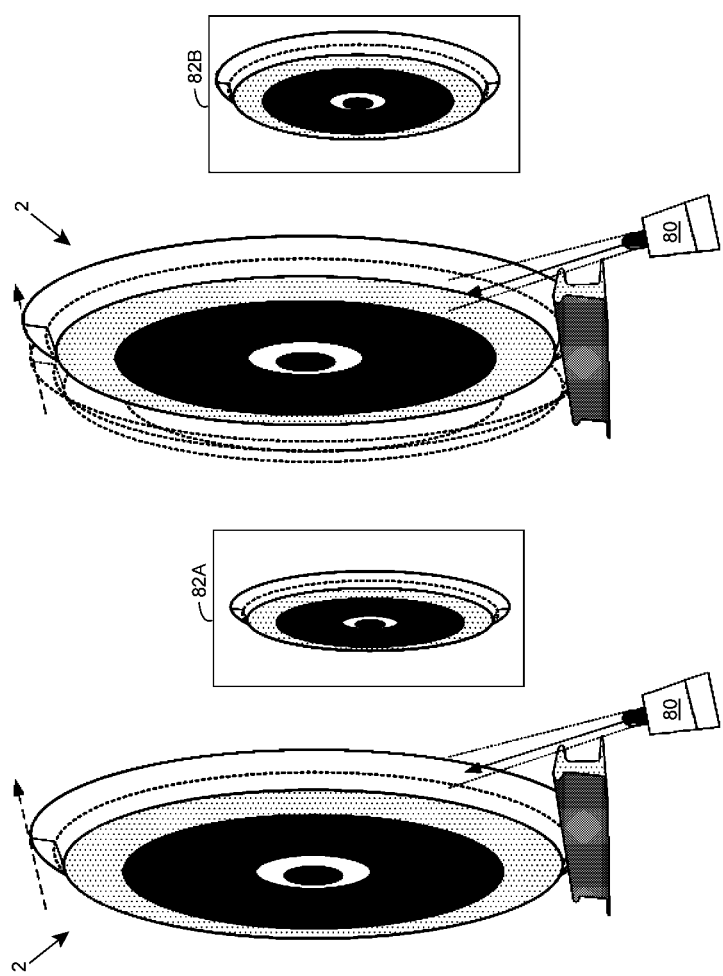
FIG. 8 shows another illustrative solution for acquiring image data of a rail wheel according to an embodiment.

Similarly, measurement module 44 can use multiple images captured by a single camera to construct a mathematical model of rail wheel 2. To this extent, FIG. 8 shows another illustrative solution for acquiring image data of a rail wheel 2, which measurement module 44 can use to construct a mathematically accurate model of rail wheel 2, according to an embodiment. In this embodiment, camera 80 can be located on an opposite side of the rail as the flange of rail wheel 2 in a known position with respect to the rail and a known field and direction of view. Camera 80 acquires two images 82A-B of rail wheel 2 as it moves along the rail. The movement of rail wheel 2 between the time that the two images 82A-B are acquired, causes the field and direction of view of camera 80 in the second image 82B to impinge upon rail wheel 2 in a location farther along rail wheel's 2 side as compared to the first image 82A. Measurement module 44 can obtain a speed of rail wheel 2 and a time between images 82A-B to determine a distance traveled by rail wheel 2 between images 82A-B. Using this distance, measurement module 44 can perform the appropriate calculations (e.g., triangulation and mapping) to yield a mathematical model of rail wheel 2, which measurement module 44 can use to determine the measurements for rail wheel 2. It is understood that while two images are shown and described in FIGS. 7 and 8, measurement module 44 can use any number of two or more images to improve and refine the mathematical model of rail wheel 2.

Figure 9:
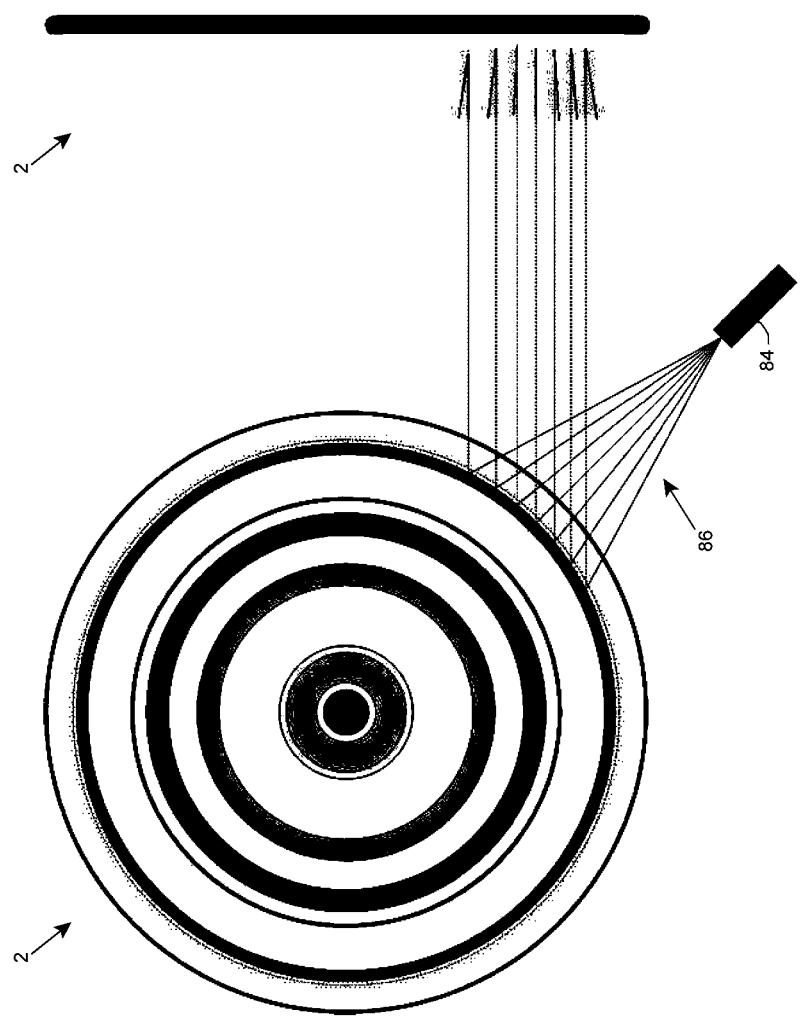
FIG. 9 shows side and front views of an illustrative solution for illuminating a tread surface of a rail wheel with lines according to an embodiment.

When measurement module 44 projects lines onto rail wheel 2 to obtain image data for wheel measurements of rail wheel 2, measurement module 44 can project the lines along a side of rail wheel 2 and obtain measurement data using any solution. Further, measurement module 44 can project lines at an oncoming rail wheel 2 in a manner such that an incidence of the lines is primarily along/across a tread (contact) surface of rail wheel 2. To this extent, FIG. 9 shows side and front views of an illustrative solution for illuminating a tread surface of a rail wheel 2 with lines 86 according to an embodiment. As illustrated, a set of laser generators 84 produce a plurality of parallel laser lines 86 having a known angular separation, which is the same for each pair of adjacent laser lines 86. When projected onto rail wheel 2, the angle and separation of the lines 86 will be distorted in a manner that is mathematically related to the degree and nature of the curve and slant of rail wheel 2 as illustrated in the front view of rail wheel 2.

When imaged by a camera (not shown) located adjacent to laser generator(s) 84, the separation of the lines 86 will differ based on the curve of the tread surface of rail wheel 2. In particular, the lines 86 toward an upper portion of rail wheel 2 will be further separated than the lines 86 toward a bottom portion of rail wheel 2. Further, the lines 86 will be angled due to the slant of rail wheel 2. Since the intersection of lines 86 with rail wheel 2 varies in a known geometric manner, and the projection and imaging of laser lines can be done with known geometric relationships between laser generator(s) 84, rail wheel 2, and the camera, measurement module 44 can use the image data to generate a mathematical model of the tread surface of rail wheel 2 using any solution.

While a single laser generator 84 is shown producing the laser lines 86, it is understood that any number of laser generators 84, each of which generates one or more laser lines 86, can be utilized. Further, while laser lines 86 are substantially parallel and have the same separation angle, it is understood that any configuration of lines 86 can be utilized. To this extent, FIG. 10 shows side and front views of another illustrative solution for illuminating a tread surface of a rail wheel 2 with lines 90 according to an embodiment. In this embodiment, laser generators 88A-B are shown projecting horizontal sets of substantially parallel lines, while laser generator 88C projects a vertical set of substantially parallel lines. In this manner, laser generators 88A-C project laser lines 90 that form a grid pattern on the tread surface of rail wheel 2. As discussed above, measurement module 44 can use the distortion and spacing of the grid pattern to calculate the shape of the illuminated portion of rail wheel 2 and generate a mathematical model of rail wheel 2, which measurement module 44 can use to derive a set of measurements for rail wheel 2.

It is understood that measurement module 44 can utilize lines having any of various geometric forms, including for example, cross hair(s). Further, measurement module 44 can include any of various numbers of laser generators, positioning and aiming of laser generators, geometric forms produced by laser generators, and/or the like. Still further, measurement module 44 can use other non-laser illumination solutions, including use of ambient radiation (e.g., visible light, near-infrared, infrared, ultraviolet, and/or the like), non-coherent light (e.g., diffuse constant illumination, strobe/flash lighting, and/or the like), and/or the like, in combination with or alternatively to the use of laser light. Still further, measurement module 44 can utilize modification(s) to the rail, such as inclusion of a reflective material, or other aspects of the imaging environment to enhance a contrast between rail wheel 2 and the remainder of the imaged area.

Returning to FIGS. 1-3, while wayside measurement component 26 has been primarily shown and described as including measurement module(s) 44 for capturing image data on rail wheels of rail vehicles 4A-C, it is understood that measurement module(s) 44 can capture other types of data on rail vehicles 4A-C in addition to or alternatively to image data on rail wheels. For example, a measurement module 44 can: acquire data (e.g., using an under-track video system) for evaluating an operating condition of various suspension components; acquire data (e.g., using an acoustic analysis system) for detecting failing bearings; and/or the like. To this extent, in an embodiment, measurement module 44 can include a system as shown and described in U.S. patent application Ser. No. 11/748,714, titled "Vehicle evaluation using infrared data", which was filed on 15 May 2007, and which is incorporated by reference. In this case, measurement module 44 can evaluate brake components, bearings, brake leakage, and/or the like, by identifying anomaly(ies) in the infrared data. Similarly, measurement module 44 can include various sensors that enable the detection of over height/extra wide loads (e.g., using light beam(s), metal sensor(s), image processing, and/or the like).

Further, wayside measurement component 26 can acquire other data on the rail environment. For example, wayside measurement component 26 can include a set of video cameras (visible light, near-infrared, infrared, or the like), which can acquire video data that management component 24 can process to provide security and/or safety monitoring using any solution. As processing system 20 would already be tracking the approach of trains, processing system 20 can further utilize video information, especially in remote areas or critical locations, to detect potential unauthorized activity in the neighborhood of the track. For example, the camera(s) could monitor the switches in the area, and management component 24 can alert relevant authorities, if image analysis detects a potentially unauthorized person or vehicle at or near the switch. Processing system 20 could identify authorized personnel in a number of ways, e.g., by carrying a "smart ID" tag which could be detected by a reader in the vicinity of the critical rail components. Additionally, measurement module 44 can implement automated/semi-automated/manual inspections of additional features of rail vehicles 4A-C, such as safety appliances (e.g., ladders), based on the video/image data using any solution.

Further, it is understood that wayside measurement component 26 can be implemented in any location and/or in any manner. For example, measurement module(s) 44 may already be utilized at a classification yard, or the like. In this case, additional module(s), such as vehicle sensing module 40 and/or wheel sensing module 42, component(s), such as management component 24, and/or the like, can be added and integrated with measurement module(s) 44 to enable the functionality described herein.

While processing system 20 has been shown and described as implementing various processes/actions using illustrative configurations of components, modules, and devices, it is understood that these configurations are only illustrative and that the invention is not limited to any particular combination of components, modules, and/or devices. To this extent, any of the various processes/actions shown and described herein can be implemented by another component/module shown and described herein, or by a separate component/module that is not expressly shown and described herein. As used herein, the terms component and module mean any configuration of hardware, with or without software, which is configured to implement the functionality described in conjunction therewith using any solution. Regardless, it is understood that two or more components/modules/systems may share some/all of their respective hardware.

Still further, some or all of processing system 20 could be implemented apart from a classification yard, e.g., as part of a rail line (e.g., a high-speed rail line) that handles a significant amount of rail traffic. In this embodiment, some or all of management component 24 can be located remote from wayside measurement component 26. In any event, in this embodiment, processing system 20 can evaluate the passing rolling stock in a similar fashion, and automatically send the evaluations forward to a destination of the train. An evaluation that indicates a hazard can be routed directly to system(s) connected to individual(s) responsible for safety and maintenance of the railroad or railroads in the relevant area, for immediate action. To this extent, the safety/maintenance personnel can contact an engineer or other personnel on board the train via a wireless terminal on-board the train, or the like, as to the nature and severity of any detected anomalies. Further, when necessary, the engineer can be instructed to and/or independently take action, such as slowing a speed of the train, in response to the detected anomaly(ies).

While shown and described herein as a method and system for processing rail vehicles, it is understood that aspects of the invention further provide various alternative embodiments. For example, in one embodiment, the invention provides a method of generating a system for processing rail vehicles. In this case, zero or more of the programs, devices, modules, components, etc., of a computer system, such as processing system 20 (FIG. 2), can be obtained (e.g., created, maintained, made available, etc.) and one or more programs, devices, modules, components, etc., for performing a process described herein can be obtained (e.g., created, purchased, used, modified, etc.) and deployed to the computer system. To this extent, the deployment can comprise one or more of: (1) installing program code on a computing device from a computer-readable medium; (2) adding and/or configuring one or more devices (e.g., computing, communications, sensors, emitters, etc.) to the computer system; and (3) incorporating and/or modifying the computer system to enable it to perform a process described herein.

It is understood that aspects of the invention can be implemented as part of a business method that performs a process described herein on a subscription, advertising, and/or fee basis. That is, a service provider could offer to process rail vehicles as described herein. In this case, the service provider can manage (e.g., create, maintain, support, etc.) a computer system, such as processing system 20 (FIG. 2), that performs a process described herein for one or more customers. In return, the service provider can receive payment from the customer(s) under a subscription and/or fee agreement, receive payment from the sale of advertising to one or more third parties, and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of processing rail vehicles, the method comprising:

identifying each individual rail vehicle as it moves along a set of rails, the identifying including:

emitting and detecting a plurality of horizontally spaced electromagnetic beams across the set of rails, the plurality of electromagnetic beams having a height and angle that enable the detection of a gap between any two of a plurality of types of connected railroad cars without regard to a height of any component of any of the connected railroad cars with respect to the coupler assemblies of the connected railroad cars or a number of wheels of any of the connected railroad cars, wherein the horizontal spacing of the electromagnetic beams is less than a width of the gap; and identifying each rail vehicle based on obstructions of the plurality of electromagnetic beams, an order in which the plurality of electromagnetic beams are obstructed, and an amount of time the plurality of electromagnetic beams are obstructed;

acquiring data for each identified rail vehicle as it moves along the set of rails; and providing the acquired data for processing each identified rail vehicle.

2. The method of claim 1, the acquiring including:
detecting a rail wheel while the rail vehicle is moving;
measuring the rail wheel while the rail vehicle is moving;
evaluating the rail wheel for at least one defect based on the measuring; and
including evaluation data on the rail wheel in the data for the rail vehicle.

3. The method of claim 2, further comprising routing the rail vehicle for servicing when the evaluation data indicates a defect for at least one rail wheel on the rail vehicle.

4. The method of claim 1, wherein the identifying is performed at an entrance of a classification yard, the acquiring including:
obtaining a destination for each rail vehicle, wherein the destination is a distinct rail yard from the classification yard; and
obtaining evaluation data for the rail wheels of a rail vehicle while the rail vehicle is moving;
the method further comprising automatically routing each rail vehicle based on one of: an outgoing train designated for rail vehicles traveling to the destination or the evaluation data.

5. The method of claim 4, the acquiring further including identifying a location of the rail wheel on the rail vehicle, the providing including providing an identification of the rail vehicle, the defect, and the location of the rail wheel on the rail vehicle.

6. The method of claim 1, the acquiring including:
determining a direction of the movement of a rail vehicle; and
accounting for any change in the direction when identifying and acquiring data for the rail vehicle.

7. The method of claim 6, the acquiring further including determining when a rail wheel is at an exact position using a pair of wheel sensors, the determining a direction of the movement including identifying an order in which a presence of the rail wheel was detected by the pair of wheel sensors.

8. A system for processing rail vehicles, the system comprising:
a component for identifying each individual rail vehicle as it moves along a set of rails, wherein the component for identifying is configured to:
emit and detect a plurality of horizontally spaced electromagnetic beams across the set of rails, the plurality of electromagnetic beams having a height and angle that enable the detection of a gap between any two of a plurality of types of connected railroad cars without regard to a height of any component of any of the connected railroad cars with respect to coupler assemblies of the connected railroad cars or a number of wheels of any of the connected railroad cars, wherein the horizontal spacing of the electromagnetic beams is less than a width of the gap; and identify each rail vehicle based on obstructions of the plurality of electromagnetic beams, an order in which the plurality of electromagnetic beams are obstructed, and an amount of time the plurality of electromagnetic beams are obstructed;

a component for acquiring data for each identified rail vehicle as it moves along the set of rails; and a component for providing the acquired data for processing each identified rail vehicle.

9. The system of claim 8, wherein the component for acquiring is configured to:
detect and measure a rail wheel while the rail vehicle is moving;
evaluate the rail wheel for at least one defect based on the measurement; and
include evaluation data on the rail wheel in the data for the rail vehicle.

10. The system of claim 9, further comprising a component for routing the rail vehicle for servicing when the evaluation data indicates a defect for at least one rail wheel on the rail vehicle.

11. The system of claim 8, wherein the identifying is performed at an entrance of a classification yard, wherein the component for acquiring is configured to:
obtain a destination for each rail vehicle, wherein the destination is a distinct rail yard from the classification yard; and
obtain evaluation data for the rail wheels of a rail vehicle while the rail vehicle is moving;
the system further comprising a component for automatically routing each rail vehicle based on one of: an outgoing train designated for rail vehicles traveling to the destination or the evaluation data.

12. The system of claim 11, wherein the component for acquiring is further configured to identify a location of the rail wheel on the rail vehicle; and
wherein the component for providing is configured to provide an identification of the rail vehicle, the defect, and the location of the rail wheel on the rail vehicle.

13. The system of claim 8, wherein the component for acquiring is configured to determine a direction of the movement of a rail vehicle and account for any change in the direction when identifying and acquiring data for the rail vehicle.

14. The system of claim 13, wherein the component for acquiring is further configured to determine when a rail wheel is at an exact position using a pair of wheel sensors and determine the direction by identifying an order in which a presence of the rail wheel was detected by the pair of wheel sensors.

15. A system for processing a series of connected rail vehicles, the system comprising:
a component for identifying each individual rail vehicle in the series of connected rail vehicles as it moves along a set of rails without regard to a height of any component of any of the connected railroad cars with respect to coupler assemblies of the connected railroad cars or a number of wheels of any of the connected railroad cars, wherein the component for identifying is located at an entrance of a classification yard;

a component for acquiring data for each identified rail vehicle, wherein the component for acquiring is configured to:
  obtain a destination for each rail vehicle, wherein the destination is a distinct rail yard from the classification yard;
  detect a rail wheel while the rail vehicle is moving;
  determine a direction of the movement of the rail wheel;
  measure the rail wheel while the rail vehicle is moving;
  evaluate the rail wheel for at least one defect based on the measuring; and
  include evaluation data for the rail wheel in the data for the rail vehicle, wherein each individual rail vehicle is identified and the rail vehicle corresponding to the rail wheel is determined based on obstructions of a set of electromagnetic beams emitted across the set of rails and the direction of the movement of the rail wheel; wherein the horizontal spacing of the electromagnetic beams is less than a width of a gap between the railroad cars; and
a component for providing the acquired data for processing each identified rail vehicle.

16. The system of claim 15, further comprising a component for routing each rail vehicle based on one of: an outgoing train designated for rail vehicles traveling to the destination or the evaluation data.

17. The system of claim 15, wherein the component for acquiring is further configured to identify a location of the rail wheel on the rail vehicle; and wherein the component for providing is configured to provide an identification of the rail vehicle, the at least one defect, and the location of the rail wheel on the rail vehicle when the evaluation data indicates at least one defect.

18. The system of claim 15, wherein the component for identifying is configured to:
  emit and detect a set of electromagnetic beams across the set of rails, the set of electromagnetic beams having a height and angle that enable the detection of a gap between any two of a plurality of types of connected railroad cars; and
  identify each rail vehicle based on an obstruction of at least one of the set of electromagnetic beams.

19. The system of claim 15, wherein the component for acquiring includes a pair of wheel sensors that are used to detect a rail wheel, determine when the rail wheel is at an exact position, and determine a direction of movement of the rail wheel.

20. The system of claim 15, wherein the component for acquiring is configured to obtain a set of destinations for the series of rail vehicles, each destination corresponding to a position of a rail vehicle in the series of rail vehicles, and assign a destination to each rail vehicle based on the position of the rail vehicle and a corresponding destination in the set of destinations.

* * * * *